(12) United States Patent
Kranz et al.

(10) Patent No.: US 6,577,405 B2
(45) Date of Patent: Jun. 10, 2003

(54) PHASE PROFILOMETRY SYSTEM WITH TELECENTRIC PROJECTOR

(75) Inventors: David M. Kranz, Minneapolis, MN (US); Eric P. Rudd, Hopkins, MN (US); David Fishbaine, Minnetonka, MN (US); Carl E. Haugan, St. Paul, MN (US)

(73) Assignee: CyberOptics Corporation, Golden Valley, MN (US)

( * ) Notice: Subject to any disclaimer, the term of this patent is extended or adjusted under 35 U.S.C. 154(b) by 126 days.

(21) Appl. No.: 09/754,991

(22) Filed: Jan. 5, 2001

(65) Prior Publication Data

US 2001/0033386 A1 Oct. 25, 2001

Related U.S. Application Data

(63) Continuation-in-part of application No. 09/522,519, filed on Mar. 10, 2000, and a continuation-in-part of application No. 09/524,133, filed on Mar. 10, 2000.
(60) Provisional application No. 60/175,049, filed on Jan. 7, 2000.

(51) Int. Cl.[7] ............................................. G01B 11/24
(52) U.S. Cl. ...................... 356/601; 356/604; 356/605; 356/630
(58) Field of Search ................................ 356/604, 605, 356/630, 634, 625, 601

(56) References Cited

U.S. PATENT DOCUMENTS

| 2,625,856 | A | 1/1953 | Muller |
| 3,777,061 | A | 12/1973 | Takemura .................... 178/5.4 |
| 3,995,107 | A | 11/1976 | Woywood .................... 178/7.1 |
| 4,541,010 | A | 9/1985 | Alston .......................... 358/44 |
| 4,598,321 | A | 7/1986 | Elabd et al. ................. 358/213 |

(List continued on next page.)

FOREIGN PATENT DOCUMENTS

| DE | 4011407 | 10/1991 |
| DE | 40 11 407 a1 | 10/1991 |
| DE | 19 511 160 A1 | 10/1996 |
| EP | 0660 078 A1 | 12/1994 |
| EP | 0 453 977 a2 | 3/1999 |
| WO | WO 98/59490 | 12/1998 |
| WO | WO 99/12001 | 3/1999 |
| WO | WO 99/24786 | 5/1999 |
| WO | WO 0106210 A1 | 1/2001 |
| WO | WO 0154068 A2 | 7/2001 |
| WO | WO 02/01209 A1 | 1/2002 |
| WO | WO 02/01210 A1 | 1/2002 |

OTHER PUBLICATIONS

Copy of International Search Report from Application No. PCT/US00/42764 with international filing date of Dec. 12, 2000.
Copy of International Search Report from Application No. PCT/US00/42760 with international filing date of Dec. 12, 2000.
U.S. patent application Ser. No. 09/522,519, Skunes et al., filed Mar. 10, 2000.

(List continued on next page.)

Primary Examiner—Frank G. Font
Assistant Examiner—Roy M Punnoose
(74) Attorney, Agent, or Firm—Westman, Champlin & Kelly, P.A.

(57) ABSTRACT

An optical system for computing a height of a target on a surface includes a light projector for projecting light. The light passes through a patterned reticle and a projector lens so as to illuminate the target with an image of the pattern. The light is projected telecentrically between the reticle and the projector lens, and a camera is positioned along a receive optical path. The camera receives an image of the target through a receive lens. The target and the pattern move at least three times with respect to each other, and the camera acquires an image of the object at each of at least three positions.

24 Claims, 3 Drawing Sheets

U.S. PATENT DOCUMENTS

| | | | |
|---|---|---|---|
| 4,641,972 A | 2/1987 | Halioua et al. | 356/376 |
| 4,643,565 A | 2/1987 | Goto | 356/24 |
| 4,677,473 A | 6/1987 | Okamoto et al. | 358/101 |
| 4,782,394 A | 11/1988 | Hieda et al. | 358/213.19 |
| 4,835,616 A | 5/1989 | Morcom | 358/213.19 |
| 4,949,172 A | 8/1990 | Hunt et al. | 358/101 |
| 4,963,024 A | 10/1990 | Ulich | 356/342 |
| 4,984,893 A | 1/1991 | Lange | 356/376 |
| 5,039,868 A | 8/1991 | Kobayashi et al. | 250/572 |
| 5,069,548 A | 12/1991 | Boehnlein | 356/376 |
| 5,091,963 A | 2/1992 | Litt et al. | 382/8 |
| 5,103,105 A | 4/1992 | Ikegaya et al. | 250/561 |
| 5,135,308 A | 8/1992 | Kuchel | 356/376 |
| 5,278,634 A | 1/1994 | Skunes et al. | 356/400 |
| 5,298,734 A | 3/1994 | Kokubo | 250/208.1 |
| 5,307,152 A | 4/1994 | Boehnlein et al. | 356/376 |
| 5,406,372 A | 4/1995 | Vodanovic et al. | 356/394 |
| 5,424,552 A | 6/1995 | Tsuji et al. | 250/548 |
| 5,450,204 A | 9/1995 | Shigeyama et al. | 356/378 |
| 5,450,228 A | 9/1995 | Boardman et al. | 359/209 |
| 5,455,870 A | 10/1995 | Sepai et al. | 382/147 |
| 5,546,127 A | 8/1996 | Yamashita et al. | 348/297 |
| 5,555,090 A * | 9/1996 | Schmutz | 356/601 |
| 5,636,025 A | 6/1997 | Bieman et al. | 356/374 |
| 5,646,733 A | 7/1997 | Bieman | 356/376 |
| 5,668,665 A | 9/1997 | Choate | 359/663 |
| 5,684,530 A | 11/1997 | White | 348/131 |
| 5,686,994 A | 11/1997 | Tokura | 356/394 |
| 5,691,784 A | 11/1997 | Häusler et al. | 349/1 |
| 5,708,532 A | 1/1998 | Wartmann | 359/663 |
| 5,761,337 A | 6/1998 | Nishimura et al. | 382/150 |
| 5,774,221 A | 6/1998 | Guerra | 356/376 |
| 5,815,275 A | 9/1998 | Svetkoff et al. | 356/376 |
| 5,867,604 A | 2/1999 | Ben-Levy et al. | 382/254 |
| 5,912,984 A | 6/1999 | Michael et al. | 382/149 |
| 5,953,448 A | 9/1999 | Liang | 382/154 |
| 5,969,819 A | 10/1999 | Wang | 356/371 |
| 5,982,927 A | 11/1999 | Koljonen | 382/168 |
| 5,991,461 A | 11/1999 | Schmucker et al. | 382/284 |
| 5,999,266 A | 12/1999 | Takahashi et al. | 356/376 |
| 6,061,476 A | 5/2000 | Nichani | 382/270 |
| 6,084,712 A | 7/2000 | Harding | 359/618 |
| 6,180,935 B1 | 1/2001 | Hoagland | 250/208.1 |
| 6,232,724 B1 | 5/2001 | Onimoto et al. | 315/161 |
| 6,268,923 B1 | 7/2001 | Michniewicz et al. | 356/512 |
| 6,269,197 B1 | 7/2001 | Wallack | 382/285 |
| 6,307,210 B1 | 10/2001 | Suzuki et al. | 250/559.08 |

OTHER PUBLICATIONS

U.S. patent application Ser. No. 09/524,133, Fishbaine et al., filed Mar. 10, 2000.

"3–D Profilometry Based on Modulation Measurement", by Likun et al., vol. 19 9, pp. 1–11 (Sep. 1999).

"High Frame Rate Cameras", *Princeton Instruments Catalog of High Performance Digital CCD Cameras*, 2 pages (Oct. 1994).

"Area Array CCD Image Sensor 1024 × 1024 Pixels with Antiblooming", CCD Prod Thomson–CSF Semiconducteurs Specifiques, pp. 267–273 (1996).

"Rank Order Morphological Hit–Miss Transform and Its Optical Implementation", by Huiquan et al., ACTA OPTICA SINICA, vol. 19, No. 9, pp. 1256–1263 (Sep. 1999).

"Cognex and Sony Team Develops Machine–Vision Camera", *Vision Systems Design*, p. 15 (Feb. 1999).

"Accurate Machine Vision is the 'Telecentric Advantage'", 3 pages from website.

* cited by examiner

PHASE PROFILOMETRY SYSTEM WITH TELECENTRIC PROJECTOR

CROSS-REFERENCE TO CO-PENDING APPLICATION AND CLAIM OF PRIORITY

This application is a Continuation-in-Part and claims priority benefits from U.S. patent application Ser. No. 09/522,519, filed Mar. 10, 2000, and entitled "INSPECTION SYSTEM WITH VIBRATION RESISTANT VIDEO CAPTURE" and U.S. patent application Ser. No. 09/524,133, filed Mar. 10, 2000, and entitled "SOLDER PASTE INSPECTION SYSTEM" which both claim priority to provisional application Ser. No. 60/175,049, filed Jan. 7, 2000.

RELATED APPLICATION

U.S. patent application Ser. No. 08/607,845, filed Feb. 27, 1996, and entitled "METHOD AND APPARATUS FOR HIGH PRECISION THREE DIMENSIONAL IMAGING USING MULTIPHASED STRUCTURED LIGHT".

BACKGROUND OF THE INVENTION

The present invention relates to measuring height variations of a surface of a three-dimensional object. More specifically, the present invention relates to phase profilometry systems.

Mapping the surface of a three-dimensional object has many applications in a wide variety of fields. Such a determination can be used to identify an object, the position of an object, and the size and shape of an object. This data may be used as an input to an automated system.

There are a number of, non-contact techniques which can be used to determine a surface profile. For example, U.S. Pat. Nos. 4,641,972 and 5,646,733 describe systems in which a fringe pattern is projected onto a surface of an object. By measuring the phase of the fringe pattern on the object, the surface profile can be determined. In general, such systems project a fringe pattern onto the object at a plurality of phases, and capture images of the object at each of the those phases. The phase displacement can be obtained through physical translation of the object or through manipulation of the projection optics used to generate the fringe pattern.

When such systems are used in automation, for example, it is particularly desirable for them to operate at a high speed and with a high degree of reliability, both in measurement accuracy and measurement repeatability. These objectives can be particularly difficult to achieve when relatively small feature sizes are being mapped. As used here, the term repeatability refers to variations in the measurement of an object's height, volume or area when it is presented to the system at different angles and at different positions within the field of view of the instrument. The speed of the system refers to the inspected area per unit time. The speed of a system, in general, can be increased by sacrificing the repeatability.

SUMMARY OF THE INVENTION

An optical system for computing a height of a target on a surface includes a light projector for projecting light. The light passes through a patterned reticle and a projector lens so as to illuminate the target with an image of the pattern that varies sinusoidally in intensity. The light is projected telecentrically between the reticle and the projector lens, and a camera is positioned along a receive optical path. The camera receives an image of the target through a receive lens. The target and the pattern move at least three times with respect to each other, and the camera acquires an image of the object at each of the positions. A processor receives the images and computes the heights accordingly.

In the preferred embodiment of the invention, the lens in the projector is telecentric both on the reticle and the target side, and the camera lens is telecentric on the target side. Another embodiment includes matched vertical pupil height in the projector and the receive optical path, so as to further increase the repeatability without adding computational complexity. In a final embodiment, a rotating refractor in positioned between the reticle and the projector lens.

DETAILED DESCRIPTION OF THE PREFERRED EMBODIMENTS

Figure 1A:
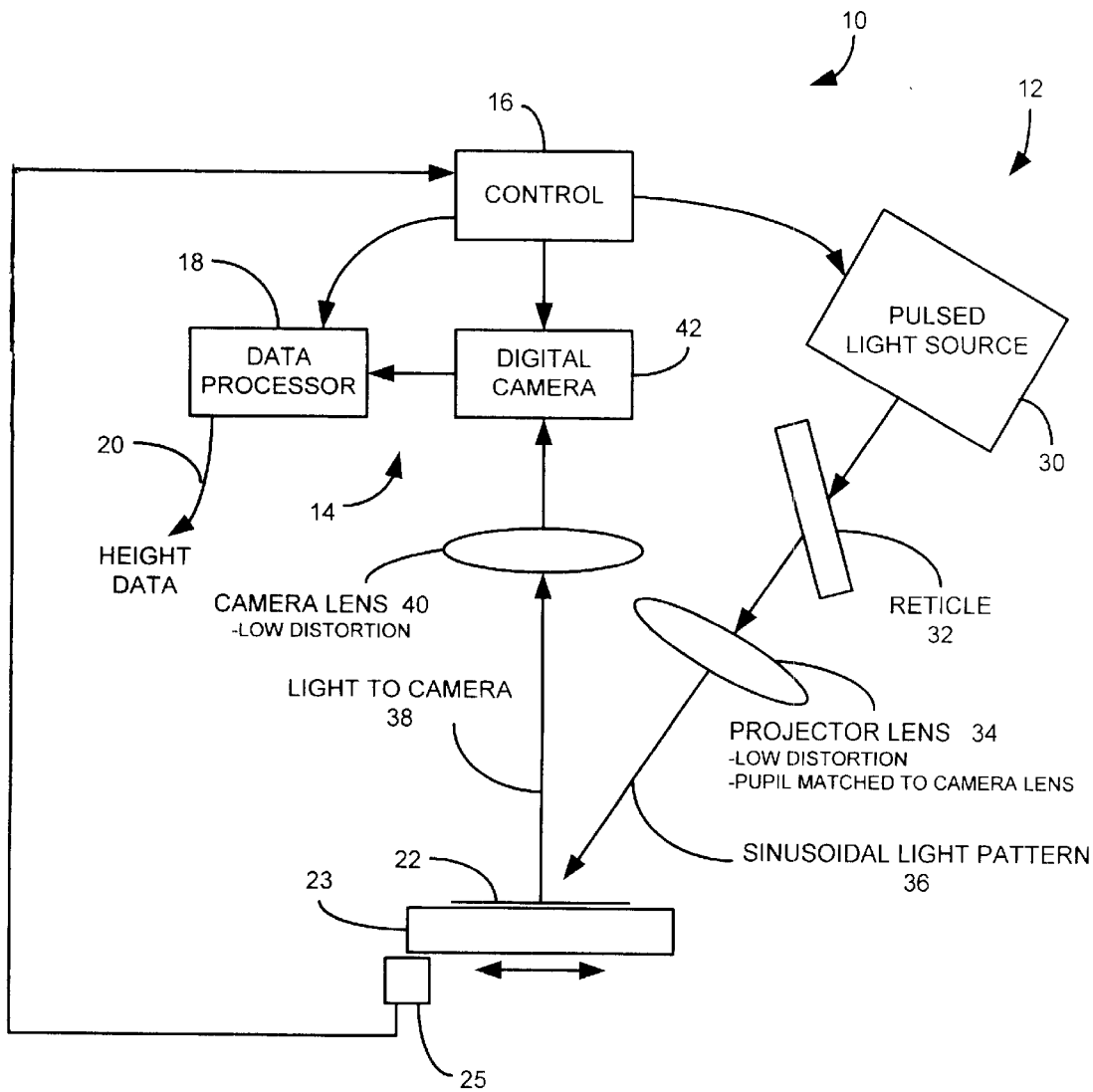
FIG. 1A is a simplified block diagram showing a phase profilometry system in accordance with one embodiment of the invention.
Figure 1B:
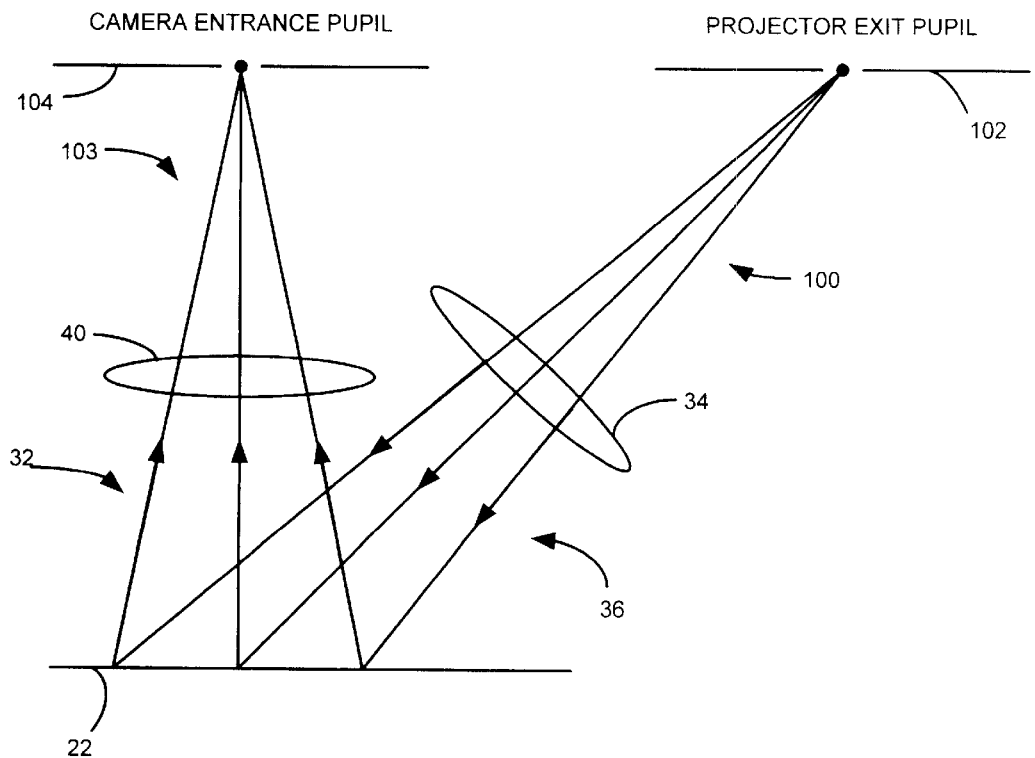
FIG. 1B shows the concept of a matched pupil optical system.
Figure 2:
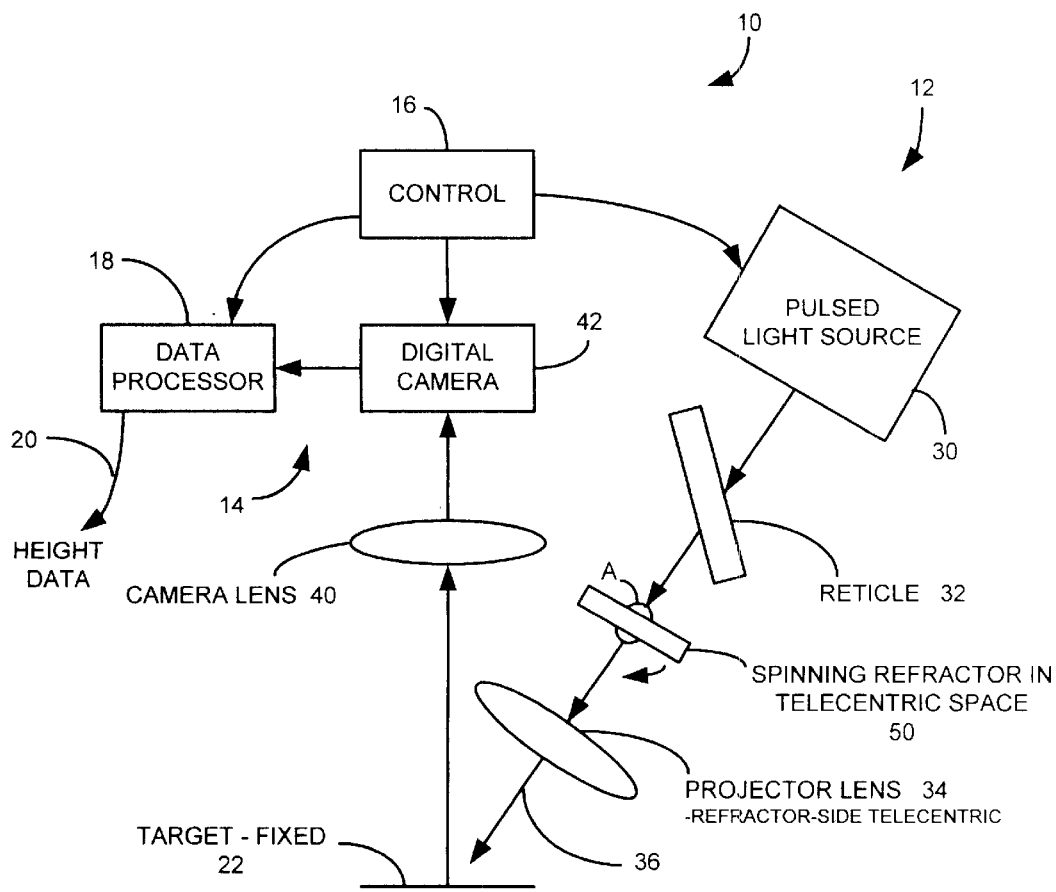
FIG. 2 is a simplified block diagram showing another phase profilometry system incorporating a rotating refractor to shift the fringe pattern.

The present invention includes a phase profilometry system 10 which is shown generally in FIGS. 1 and 2. In general, phase profilometry System 10 includes a fringe projector 12, an imaging system 14, a controller 16 and a data processor 18. System 10 illustrates a number of aspects of the invention which can operate alone or in combination to provide higher speed and increased repeatability.

Projector 12 includes a pulsed light source 30 which can comprise, for example, a flashlamp. Light source 30 provides a pulsed light output to a reticle 32. Reticle 32 can comprise, for example, a partially opaque reticle with a periodic pattern, and is used to generate a sinusoidal fringe pattern. The light from reticle 32 is directed toward target 22 through projector lens 34 which forms a sinusoidal light (fringe) pattern 36. Reflected light 38 is received by a camera lens 40 and directed toward a digital camera 42. The output from camera 42 is provided to a data processor 18 which responsively generates height data 20 as discussed herein. System 10 is controlled by controller 16.

Fringe projector 12 illuminates the target 22 at least three times with phase displacements between the at least three fringe patterns. The intensity data of the $i^{th}$ projected fringe pattern on the target varies as:

$$I_i(x, y) = R(x, y)[1 + M(x, y)\sin(f_x \cdot x + f_y \cdot y + f_z \cdot z(x, y) + \phi_i)] \quad \text{Equation 1}$$

where $I_i(x,y)$ is the light intensity at the target coordinates (x,y) exposing the digital camera 42; $R(x,y)$ is proportional to the target 22 reflectance; $M(x,y)$ is the fringe pattern modulation; $f_x$, $f_y$, and $f_z$ are the fringe pattern spatial frequencies near the target; and $\phi_i$ is the $i^{th}$ phase and z (x,y) is the target height. Height variations on the target produce a phase variation $f_z \cdot z(x,y)$ of the fringe pattern. Using three or more images $I_i(x,y)$ and the known fringe projector properties $f_x$, $f_y$, $f_z$, and $\phi_i$, the data processor 18 can compute the height data 20, $z(x,y)$.

Intensity data $I_i(x,y)$ from the three or more images must represent the intensity from substantially the same physical (x,y) location on the target 22 in order for system 10 to accurately and repeatably produce height data. That is, the images must be substantially co-sited. In circuit board inspection applications, the images usually must be co-sited to a dimension much smaller than a pixel size, approximately a few microns. Active co-siting by the data processor must be performed if the target 22 is translated in x or y between exposures.

In operation, projector 12 projects light at three or more phases relative to target 22. The phase adjustment can be achieved by any technique which shifts the fringe pattern relative to the target. One way is to keep the camera and the target stationary in (x,y) with respect to each other and to move the fringe pattern, as would be accomplished by translating the target through z with respect to both the imaging system 14 and projector 12, the moving the reticle, or by rotating a refractor (as is discussed in detail herein).

Another way of varying the phase of the fringe pattern is to move target 22 in the x or y direction relative to the projector 12 and imaging system 14. For example, target 22 can be positioned on a moveable stage 23. A position encoder 25 can detect the position of the stage 23 and provide feedback to controller 16. Digital camera 42 and the light source 30 are operated as a function of the position of the stage 23.

With this embodiment, the motion of the target 22 relative to the camera 42 does not need to have a high degree of temporal stability. The images from camera 42 are, thus, slaved to the position of target 22 at integral pixel distances, thereby allowing co-siting of the exposed images simply by shifting data within the data processor 18. Preferably, the motion of target 22 is relatively straight along a camera pixel axis and the exposures are accurately slaved to the target position. As long as the total positional errors are sufficiently small, the system can provide the desired level of repeatability without requiring pixel intensity data interpolation within processor 18. Such data interpolation can require a large amount of processing time and result in slowed system operation. Movement of target 22 relative to camera 42 does not need to be stopped in order to perform the image acquisitions if the pulsed light duration is made short enough to "freeze" the image. Continuous motion increases overall system throughput and simplifies motion control.

Digital camera 42 is a 2-dimensional CCD array sized slightly larger than the field of view in the scanning direction if there is a translation between exposures. (The CCD's width needs only to be as wide as required by the width of the field of view.) It is configured so as to rapidly (approximately 1 millisecond) acquire and store an image of a given phase. Processor 18 receives the three or more images as appropriate and uses one of two methods to relate the three images. When target 22 moves with respect to imaging system 14, processor 18 must co-site the three or more images, each of which are slightly translated images. If the phase displacement is accomplished by rotating a refractor, moving a reticle or by translating the target through z, and the target 22 is held (x,y) stationary relative to the imaging system 14, the images are intrinsically co-sited, so that any one pixel in the CCD array represents the same target area in each of the three images. Algorithms for processing height, given the three images are found in U.S. patent application Ser. No. 09/524,133, owned by the assignee as the present application and incorporated by reference herein.

Reticle 32 is tilted at an angle from the projection lens optical axis in order to maintain focus of the fringe pattern across the field of view on the target 22. In a non-telecentric optical system, tilting the reticle and object plane away from the optical axis introduces non-affine distortion into the projected fringe pattern such that $f_x$ and $f_y$ are functions of (x,y). Non-affine distortion of the fringe pattern on the target 22 results in inconsistent height calculations across the field of view. System 10 projects light telecentrically between a reticle 32 and a projector lens 34. A telecentric lens maintains a constant viewing angle of an object, such as a reticle, at any point across the aperture of the lens. Because the viewing angle is constant across the reticle, this telecentric configuration allows reticle 32 to be tilted while introducing only linear distortion in the projected fringe pattern. Of course, because the target is tilted from the projection lens optical axis, a small amount of non-affine distortion is possible in the fringe pattern on the target. A small amount of residual distortion may be reduced to tolerable levels with proper design of the fringe projector, or by introducing a compensation in the manufactured reticle pattern. Additionally, with reticle-side telecentricity, mechanical positioning precision of the reticle is less critical because axial positioning errors only produce fringe defocus, and radial positioning errors introduce only second order changes in non-affine distortion. System 10 has low distortion, in that the geometrical imaging errors, on the camera and the projector side, are small compared to the period of the fringe pattern. The reduced distortion improves the repeatability across the working apace (i.e. the volume defined by the field of view and the depth of focus) of system 10. Without reticle-side telecentricity, the distortion must generally be compensated through a time consuming data processing or a strongly compensated precision reticle must be used.

The reticle pattern has a transmission factor described by the function, t(u,v) in the plane of the reticle with coordinates (u,v), substantially governed by:

$$\int_v^{v+\Delta v} t(u, v) dv = \frac{1}{2}(1 + M\sin(f_v + u)) \qquad \text{Equation 2}$$

where $\Delta v$ is related to the point spread function of the projector lens in the v direction, $f_u$ is the fringe frequency in the u direction, and M is a modulation value less than, but preferably close to 1.

One could satisfy Equation 2 with a gray-level reticle having transmission factors invariant in the v direction, but such reticles are difficult to manufacture with consistently low harmonic distortion. Since any harmonic distortion in the fringe pattern introduces errors in the reconstructed heights, a gray-level reticle is undesirable in the preferred embodiment, this problem is solved by introducing deliberate astigmatism in the v direction such that $\Delta v$ is conveniently large. In that case, the reticle need not have constant transmission in the v direction, but may instead be any bi-level pattern that integrates to a sinusoid in accordance with Equation 2). This produces the desired sinusoidal fringes on target 22 with substantially zero harmonic distortion. Preferably, the patterned features on reticle 32 are sufficiently large that they can be reliably reproduced in manufacturing. Other projection methods are possible, such as a stigmatic projection lens with a halftone reticle pattern of a pitch much less than $\Delta v$, but they are less desirable because harmonic distortion can be caused by small changes in effective edge locations of the bi-level pattern resulting from manufacturing tolerances and diffraction.

As is apparent from Eq. 1, the measurement repeatability of the system 10 is strongly affected by the variation of $f_z$ within the working space (across the field of view and through the depth of focus) of the imaging system 14. Ideally, $f_z$ is substantially constant throughout the working space, such that a target height feature produces substantially the same phase displacement $f_z \cdot z$ throughout the working space. Generally, even when using a low-distortion projector lens and a low-distortion camera lens, there remains a strong amount of variation in $f_z$ throughout the working space due to geometric factors. Design forms of both the projector lens 43 and the camera lens 40 can remove the $f_z$ variations across the field of view or within the working space.

In one aspect of the invention, the distance in the vertical dimension between target 22 and the projector optical exit pupil is substantially the same as the distance in the vertical dimension between the target 22 and the optical entrance pupil of imaging system 14. FIG. 1 shows the concept of a matched pupil system, which has reference designator numbers identifying certain components from FIG. 1A. A set of light rays 100 appear to emanate from a geometrical point in space called the projector exit pupil 102, passing through projector lens 34 and forming a sinusoidal light pattern 36 which eventually impinges on target 22. As is well known, one can compute the position of projector exit pupil 102 by measuring the field of view of the fringe pattern approximately in the area of target 22 at least twice through a vertical distance, and applying the concept of similar triangles.

The light in the sinusoidal light pattern 36 reflects off of target 22 to form reflected light 38. Reflected light passes through camera lens 40 and the point in space at which such rays 103 would converge is called the camera entrance pupil 104. Height variations of target 22 introduce a phase shift $f_z \cdot z$ in the fringe pattern which in the case of a matched pupil system is substantially independent of the position of target 22 within the field of view of imaging system 14. This matched pupil system improves the repeatability of measurement system 10 without requiring additional complex field of view dependent compensation calculations to be performed by data processor 18. Target heights measured by system 10 are approximately constant throughout the field of view without sacrificing speed.

In another aspect of the invention, which is the preferred embodiment, lens 34 is telecentric both on the reticle side and on the target side. Further, camera lens 40 is telecentric on the target side. The projector exit pupil 102 and camera entrance pupil 104 are set at infinity, so that chief rays within light pattern 36 are substantially parallel to each other and that chief rays within reflected light 38 are also substantially parallel to each other. With this doubly telecentric configurations, the angle between the chief rays of the projected fringe pattern and the reflected image light is substantially constant throughout the working space. Additionally, magnification of the camera image is constant throughout the working space. In such an embodiment, the repeatability is further increased, as long as the distortion is held to a reasonably low value, because the height, volume, and area calculations are independent of the position of target 22 within the field of view and through the depth of focus and do not require the use of additional, position-dependent compensation. The simplified calculations increase the speed of system 10. Another benefit is that printed circuit board fiducial measurement is independent of position of target 22 within the working space.

FIG. 2 illustrates another embodiment in which a rotating refractor 50 is provided between reticle 32 and projector lens 34. Alternatively, refractor 50 is positioned between lens 34 and target 22, preferably in telecentric space. In such an embodiment, refractor 50 is rotated about an axis A (normal to the plane of the paper) to provide a phase shift to the fringe pattern projected onto target 22. The refractor 50 can comprise, for example, a parallel plate window. The angle θ of the window relative to the light will introduce a fringe displacement d in accordance with the relationship:

$$d = t \cdot \sin\theta \left[ 1 - \frac{\cos\theta}{\sqrt{n^2 - \sin^2\theta}} \right] \qquad \text{Equation 3}$$

where t is the thickness of the window, and n is the index of refraction of the window. Light source 30 and camera 42 can be coordinated by controller 16 and synchronized with the angle of refractor 50 either by assuming the rate of rotation is substantially constant and strobing as a function of time, or by strobing as a function of angular position of refractor 50. When rotating refractor 50 is located in telecentric space, the incident angle θ is constant across the refractor, therefore, phase displacement is independent of position in the field of view. Additionally, a rotating refractor can accommodate various fringe wavelengths by adjusting the angles between strobe positions. Further, various times between exposures can be accommodated by controlling the rotation speed. Possible means of rotating the refractor are mounting the retractor on: the shaft of a spinning motor, a resonant galvanometer, a servo galvanometer, or other similar mechanisms.

Although the present invention has been described with reference to preferred embodiments, workers skilled in the art will recognize that changes may be made in form and detail without departing from the spirit and scope of the invention. As used herein, the term light can refer to radiation of any wavelength. The particular optics and configurations set forth herein are provided for example only, and those skilled in the art will recognize that many other optical and system configurations can be utilized without departing from the scope and spirit of the present invention. Various techniques can be used for creating the fringe pattern as are known in the art. Furthermore, the invention can be implemented using any data processor 18 or appropriate processing algorithm. In addition, any appropriate light source, (incoherent or otherwise) or optical technique can be used to produce the light beams described herein.

What is claimed is:

1. An optical system for computing a height of a target on a surface, the system comprising:
    a light projector for projecting light, the light passing through a patterned reticle and a projector lens so as to illuminate the target with an image of the pattern, the light projected telecentrically between the reticle and the projector lens; and
    a camera positioned along a receive optical path, the camera adapted to receive an image of the target through a receive lens, where the target and the pattern are adapted to move through at least three positions with respect to each other, and the camera is further adapted to acquire an image of the object at each of the at least three positions.

2. The system of claim 1 wherein the target in positioned on a stage, and the stage moves while the image of the pattern is stationary.

3. The system of claim 2 further comprising:
    an encoder coupled to the stage and providing an encoder output; and
    control electronics for the light projector, where the control electronics selectively energize the light projector as a function of the encoder output.

4. The system of claim 1 wherein an adjustable refractor is positioned between the reticle and the projector lens, the refractor adapted to selectively move the fringe pattern relative to the target.

5. The system of claim 4 wherein the adjustable refractor comprises a rotating refractor.

6. The system of claim 4 wherein the adjustable refractor comprises a galvanometer retractor.

7. The system of claim 1 wherein the light passing between the receive lens and one target is telecentric.

8. The system of claim 1 wherein the receive lens has an entrance pupil and the projector lens has an exit pupil, where a vertical distance between either of the pupils with respect to the target is substantially the same.

9. The system of claim 8 where the pupils are set at any substantially infinite distance from the target.

10. The system of claim 1 wherein the light passing between the projection lens and the target is telecentric.

11. The system of claim 10 wherein a refractor is positioned between the projector lens and the target, the refractor having an axis of rotation oriented with respect to the patter so that when the refractor rotates, the fringe pattern moves on the object.

12. The system of claim I wherein the projector lens is astigmatic.

13. The optical system of claim 1 wherein the light pattern from the light projector exits therefrom at a first height, and where the camera is set to a second height, where the first and second height are substantially equal.

14. The optical system of claim 1 wherein the light projector includes a flashlamp.

15. The optical system of claim 1 wherein the reticle includes a periodic pattern thereon.

16. The optical system of claim 15 wherein the pattern is astigmatic, so as to form sinusoidally shaped fringes on the target.

17. The optical system of claim 1 wherein the reticle comprises a retractor adapted to rotate to a plurality of positions as the light passes therethrough, each position corresponding to a different phase of the image of the pattern.

18. The optical system of claim 1 wherein the system further comprises:

a motion mechanism configured to move the target relative to the system; and an encoder configured to encode the position of the target, where the light projector actuates as a function of the position of the target.

19. A method of computing height of a target on a surface comprising:

projecting light from a projector through a patterned reticle to create a fringe pattern;

directing the fringe pattern at the target;

changing the relative position of the fringe pattern and the target through at least three positions;

imaging the fringe pattern projected on the target at the at least three positions; and determining target height as a function of the imaging, wherein the light is projected telecentrically between the reticle and the projector.

20. The method of claim 19 wherein changing the relative position of the fringe pattern comprises rotating the reticle.

21. The method of claim 19 including initiating the step of projecting light as a function of target position.

22. The method of claim 19 wherein the imaging is telecentric.

23. The method of claim 19 including using an astigmatic projector lens to project the light.

24. The method of claim 19 where the light is projected from a first point substantially vertically equidistant from a second point at which the fringe pattern is imaged.

* * * * *

UNITED STATES PATENT AND TRADEMARK OFFICE
CERTIFICATE OF CORRECTION

PATENT NO. : 6,577,405 B2
DATED : June 10, 2003
INVENTOR(S) : David M. Kranz et al.

It is certified that error appears in the above-identified patent and that said Letters Patent is hereby corrected as shown below:

Column 7,
Line 10, delete "one" and insert -- the --.
Line 21, delete "patter" and insert -- pattern --.

Signed and Sealed this

Twenty-second Day of June, 2004

JON W. DUDAS
*Acting Director of the United States Patent and Trademark Office*